United States Patent
Ding et al.

(10) Patent No.: US 12,260,654 B2
(45) Date of Patent: Mar. 25, 2025

(54) PEDESTRIAN DETECTION VIA A BOUNDARY CYLINDER MODEL

(71) Applicant: Volvo Car Corporation, Gothenburg (SE)

(72) Inventors: Sihao Ding, Sunnyvale, CA (US); Jui-che Tsai, Sunnyvale, CA (US)

(73) Assignee: Volvo Car Corporation, Gothenburg (SE)

(*) Notice: Subject to any disclaimer, the term of this patent is extended or adjusted under 35 U.S.C. 154(b) by 421 days.

(21) Appl. No.: 17/654,182

(22) Filed: Mar. 9, 2022

(65) Prior Publication Data
US 2023/0290162 A1  Sep. 14, 2023

(51) Int. Cl.
*G06V 20/64* (2022.01)
*G06T 7/60* (2017.01)
*G06T 17/10* (2006.01)
*G06V 10/774* (2022.01)
*G06V 20/58* (2022.01)
*G06V 40/10* (2022.01)

(52) U.S. Cl.
CPC ............. *G06V 20/64* (2022.01); *G06T 7/60* (2013.01); *G06T 17/10* (2013.01); *G06V 10/774* (2022.01); *G06V 20/58* (2022.01); *G06V 40/103* (2022.01); *G06T 2207/30196* (2013.01); *G06T 2207/30261* (2013.01)

(58) Field of Classification Search
CPC ....... G06T 17/10; G06V 20/58; G06V 40/103
See application file for complete search history.

(56) References Cited

U.S. PATENT DOCUMENTS

| | | | |
|---|---|---|---|
| 7,868,912 B2 * | 1/2011 | Venetianer | G08B 13/19667 348/143 |
| 2013/0250050 A1 * | 9/2013 | Kanaujia | H04N 13/106 348/42 |
| 2014/0072170 A1 * | 3/2014 | Zhang | G06V 20/53 382/103 |

(Continued)

FOREIGN PATENT DOCUMENTS

| CN | 104834887 A | * | 8/2015 |
|---|---|---|---|
| EP | 4242987 A1 | | 9/2023 |

OTHER PUBLICATIONS

Extended European Search Report received for European Patent Application Serial No. 23160629.4 dated Jun. 21, 2023, 11 pages.

(Continued)

*Primary Examiner* — Chan S Park
*Assistant Examiner* — Sebastian-Sy Vuchi Ngo
(74) *Attorney, Agent, or Firm* — Amin, Turocy & Watson, LLP (57) ABSTRACT

Systems, devices, computer-implemented methods, and/or computer program products that can facilitate pedestrian detection via a boundary cylinder model are addressed. In one example, a system can comprise a processor that executes computer executable components stored in memory. The computer-executable components can comprise a bounding cylinder model component that determines numerical values for height and radius parameters of a three-dimensional bounding cylinder model representing a pedestrian, and that generates the three-dimensional bounding cylinder model representing the pedestrian based on the numerical values.

20 Claims, 7 Drawing Sheets

(56) References Cited

U.S. PATENT DOCUMENTS

| | | | |
|---|---|---|---|
| 2018/0173963 A1* | 6/2018 | Taylor | G06V 20/52 |
| 2021/0026134 A1* | 1/2021 | Harkins | G02F 1/1334 |
| 2021/0123717 A1 | 4/2021 | Wierda et al. | |
| 2024/0081679 A1* | 3/2024 | Zenzmaier | A61B 5/1114 |

OTHER PUBLICATIONS

Florez, Sergio Alberto Rodriguez, "Contributions by Vision Systems to Multi-sensor Object Localization and Tracking for Intelligent Vehicles", HAL Open Science, Dec. 7, 2010, 194 pages.

Bekhtaoui et al., "View Invariant Human Body Detection and Pose Estimation from Multiple Depth Sensors", Computer Science, May 8, 2020, 10 pages.

Tian et al., "3D Pedestrian Detection in Farmland by Monocular RGB Image and Far-Infrared Sensing", Remote Sensing, vol. 13, No. 2896, Jul. 23, 2021, 20 pages.

Mousavian et al., "3D Bounding Box Estimation Using Deep Learning and Geometry", IEEE, Computer Society, Jul. 21, 2017, 9 pages.

Christopher et al., "DNN-Based Recognition of Pole-Like Objects in LiDAR Point Clouds", IEEE, Sep. 19, 2021, 8 pages.

Communication Pursuant to Rules 69 EPC received for EP Patent Application Serial No. 23160629.4 dated Sep. 18, 2023, 2 pages.

Communication pursuant to Article 94(3) EPC received for EP Patent Application Serial No. 23160629.4 dated May 13, 2024, 9 pages.

* cited by examiner

PEDESTRIAN DETECTION VIA A BOUNDARY CYLINDER MODEL

BACKGROUND

One or more embodiments herein relate to computing devices, and more specifically, to systems, devices, computer-implemented methods, and/or computer program products that can facilitate pedestrian detection via a boundary cylinder model.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate pedestrian detection via a boundary cylinder model are addressed.

An embodiment includes a computer-implemented system, comprising: a memory; and a processor that executes computer-executable components stored in the memory. The computer-executable components comprise: a bounding cylinder model component that determines numerical values for height and radius parameters of a three-dimensional bounding cylinder model representing a pedestrian, and that generates the three-dimensional bounding cylinder model representing the pedestrian based on the numerical values.

Another embodiment includes a computer-implemented method. The computer-implemented method comprises determining, by a system operatively coupled to a processor, numerical values for height and radius parameters of a three-dimensional bounding cylinder model representing a pedestrian, using a bounding cylinder model component; and generating, by the system, the three-dimensional bounding cylinder model representing the pedestrian based on the numerical values, using the bounding cylinder model component.

Another embodiment includes a computer program product. The computer program product comprises a computer readable storage medium having program instructions embodied therewith, which facilitate pedestrian detection via a bounding cylinder model. The program instructions are executable by the processor, causing the processor to determine, by the processor, numerical values for height and radius parameters of a three-dimensional bounding cylinder model representing a pedestrian, using a bounding cylinder model component; and to generate, by the processor, the three-dimensional bounding cylinder model representing the pedestrian based on the numerical values, using the bounding cylinder model component.

DESCRIPTION OF THE DRAWINGS

One or more exemplary embodiments are described below in the Detailed Description section with reference to the following drawings.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The principal challenge addressed by the invention is that it can provide a method of three-dimensional (3D) detection, of one or more pedestrians, by a computer-implemented system which can use a 3D bounding cylinder model as the geometric entity representing a respective pedestrian. The 3D bounding cylinder model can be based on numeric parameters of height and radius that can provide an accurate description of the physical dimensions of the respective pedestrian such that the pedestrian can be tightly enclosed within the 3D bounding cylinder model. The detection of the one or more pedestrians can be based on object detection training which can assist with generating numerical values for the height and radius parameters of the 3D bounding cylinder model.

Figure 1:
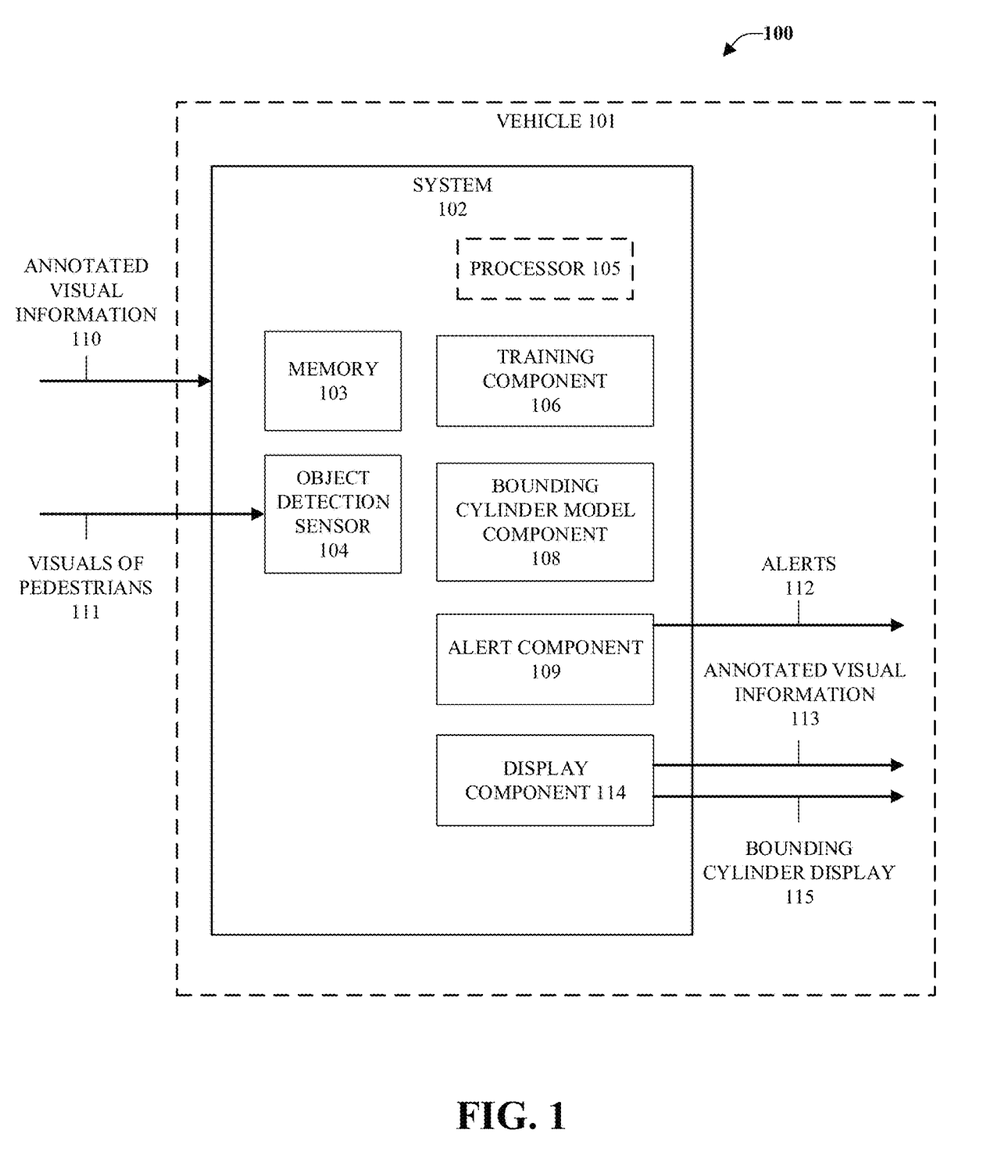
FIG. 1 illustrates a block diagram of an example, non-limiting computer-implemented system that facilitates pedestrian detection by employing a three-dimensional bounding cylinder model in accordance with one or more embodiments described herein.

FIG. 1 illustrates a block diagram of an example, non-limiting computer-implemented system that facilitates pedestrian detection by employing a three-dimensional bounding cylinder model in accordance with one or more embodiments described herein. The various embodiments described herein can relate to pedestrian detection via a bounding cylinder model. The various embodiments described herein can use a 3D bounding cylinder shape to represent a pedestrian, wherein the bounding cylinder model can be a good representation for the pedestrian since the cylinder shape can mimic the shape of a human closely due to the curvilinear characteristics of the cylinder.

In some embodiments, the computer-implemented system 102 can comprise memory 103, object detection sensor 104, processor 105, training component 106, bounding cylinder model component 108, alert component 109, and/or display component 114. In various embodiments, one or more of memory 103, object detection sensor 104, processor 105, training component 106, bounding cylinder model component 108, alert component 109, and/or display component 114 can be electrically, operatively and/or communicatively coupled to one another to perform one or more functions of pedestrian detection employing a bounding cylinder model.

In an embodiment, vehicle 101 can be a self-driving car or autonomous vehicle in an environment 100 which can include one or more pedestrians. Vehicle 101 can include system 102 which can further comprise the memory 103 and the processor 105. Memory 103 can store annotated visual information 110, which can include labels assigned to different objects for distinguishing one object from another. Processor 105 can process input data from the environment and new data generated within the system 102, by one or more of the components of system 102, to assist the one or more components of the system, to perform their specific functions.

System 102 can further comprise an object detection sensor 104 that can provide real-time, 3D detection of objects from environment 100. In some embodiments, the sensor can be a camera while in other embodiments, it can be a Light Detection and Ranging (LiDAR), or a Red, Green, Blue (RGB) sensor. The object detection sensor 104 can detect one or more pedestrians in environment 100 as visuals of pedestrians 111. The training component 106 can use the annotated visual information 110 stored in memory 103 to train the bounding cylinder model component 108, such that the bounding cylinder model component 108 can utilize the visuals of pedestrians 111, detected by the object detection sensor 104, to generate one or more respective 3D bounding cylinder models representing the one or more pedestrians. Training component 106 can use a program for training the bounding cylinder model component 108, wherein the program can comprise a backbone with two branches—a first branch that can perform keypoint detection to detect the center of a 3D bounding cylinder model, and a regression branch which can detect the height and radius parameters of the 3D bounding cylinder model. This concept is discussed in greater detail for subsequent figures.

The generation of the 3D bounding cylinder model for the respective pedestrian can be based on the determination of numerical values for height and radius parameters for the 3D bounding cylinder model, such that the height of the bounding cylinder model can be representative of the height of the respective pedestrian, and the radius of the bounding cylinder can be representative of the radial distance, from an imaginary axis running vertically through the center of the respective pedestrian, to their widest part. The training component 106 can train the bounding cylinder model component 108 to determine numerical values for the height and radius parameters for the 3D bounding cylinder model, and it can train the bounding cylinder model component to compute the position of the 3D bounding cylinder model from the object detection sensor, in 3D space.

The position of the 3D bounding cylinder model can be represented by the horizontal distance, vertical distance, and depth of the center of the bounding cylinder model from the object detection sensor 104. For determining the position of the bounding cylinder model, the object detection sensor 104 can be assigned the coordinates (0,0,0) in 3D space, and a point (x,y,z) can represent the position of the bounding cylinder model, wherein x, y, and z can respectively represent numerical values for the horizontal distance, vertical distance and depth of the center of the bounding cylinder model as measured from the point (0,0,0).

In an embodiment, the bounding cylinder model component 108 can further utilize the regression branch of the training program to compute the degree of rotation of a pedestrian of the one or more pedestrians detected by the object detection sensor 104. The degree of rotation of the pedestrian can be measured such that the pedestrians can be assumed to be standing or sitting. An imaginary axis running perpendicular to the ground can be the zero-degree (0°) mark, and the angle of the pedestrian can be measured from that mark. For example, a pedestrian standing upright can be detected as having a 0° rotation, whereas a pedestrian that can be bending toward the ground can be detected as having a non-zero degree of rotation.

The object detection sensor 104 can send visual information about the one or more pedestrians that it can detect, to alert component 109, which is communicatively coupled to the vehicle 101 and the bounding cylinder model component 108, and which can generate alerts 112 for the vehicle 101, based on determination that one or more bounding cylinder models and the vehicle have a likelihood of collision greater than a defined threshold. Alerts 112 can allow the vehicle to prevent an imminent collision with the pedestrians, either by decreasing speed or by coming to a halt.

Display component 114 can output a bounding cylinder display 115 about the pedestrians detected by the object detection sensor 104 and represented as respective 3D bounding cylinder models, which can be viewed by the operator and/or other passengers of the vehicle. Display component 114 can further output annotated visual information 113 containing the visual and numeric information generated about the pedestrians, such that information can be used as feedback by the training component 106 to train the bounding cylinder model component 108 to improve upon the accuracy of the classification and model generation as part of the training process.

Figure 2:
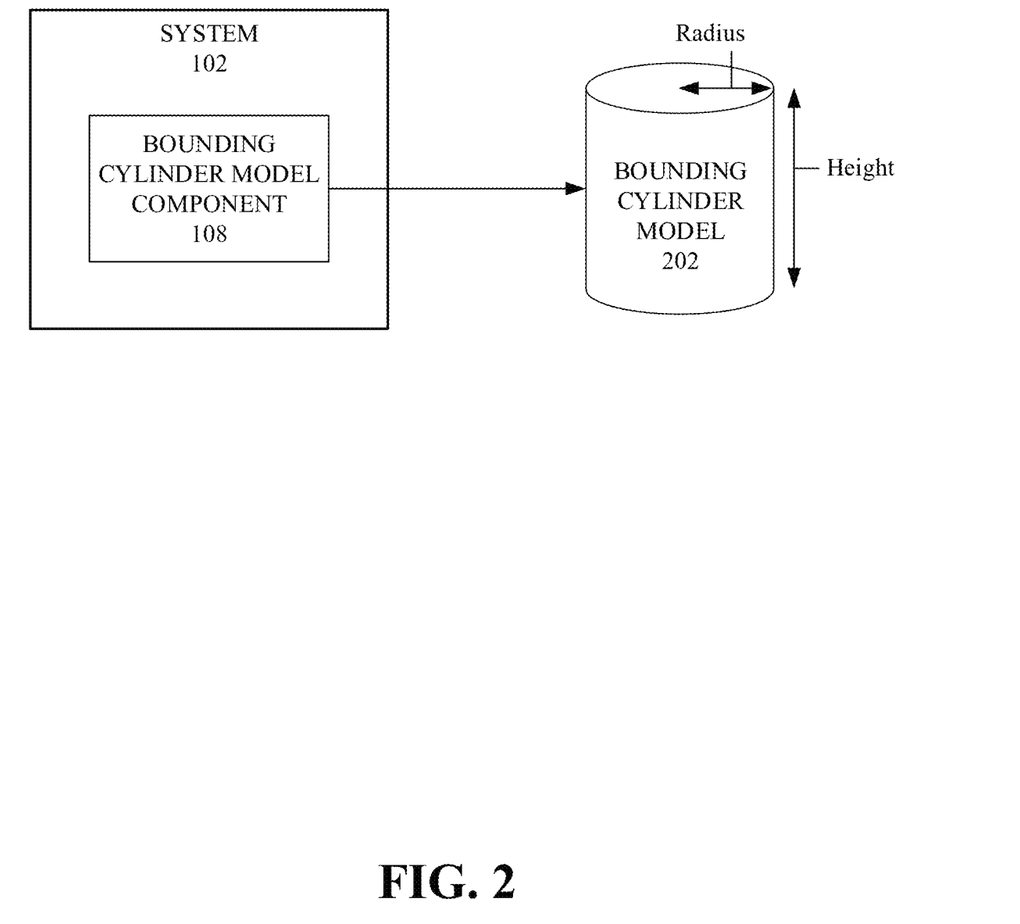
FIG. 2 illustrates an example, non-limiting computer-implemented system that facilitates pedestrian detection by employing a three-dimensional bounding cylinder model in accordance with one or more embodiments described herein.

FIG. 2 illustrates an example, non-limiting computer-implemented system that facilitates pedestrian detection by employing a three-dimensional bounding cylinder model in accordance with one or more embodiments described herein. FIG. 2 comprises system 102 and bounding cylinder model component 108 of FIG. 1, and bounding cylinder model 202. In an embodiment, system 102 can encounter a pedestrian. The bounding cylinder model component 108 of system 102 can generate numerical values for a bounding cylinder model 202 representing the pedestrian, such that the bounding cylinder model can have a height and radius. The height and radius of the bounding cylinder model 202 can accurately represent the overall size of the pedestrian, and the pedestrian's position, in 3D space, from the object detection sensor (not displayed in the figure) of system 102.

Figure 3A:
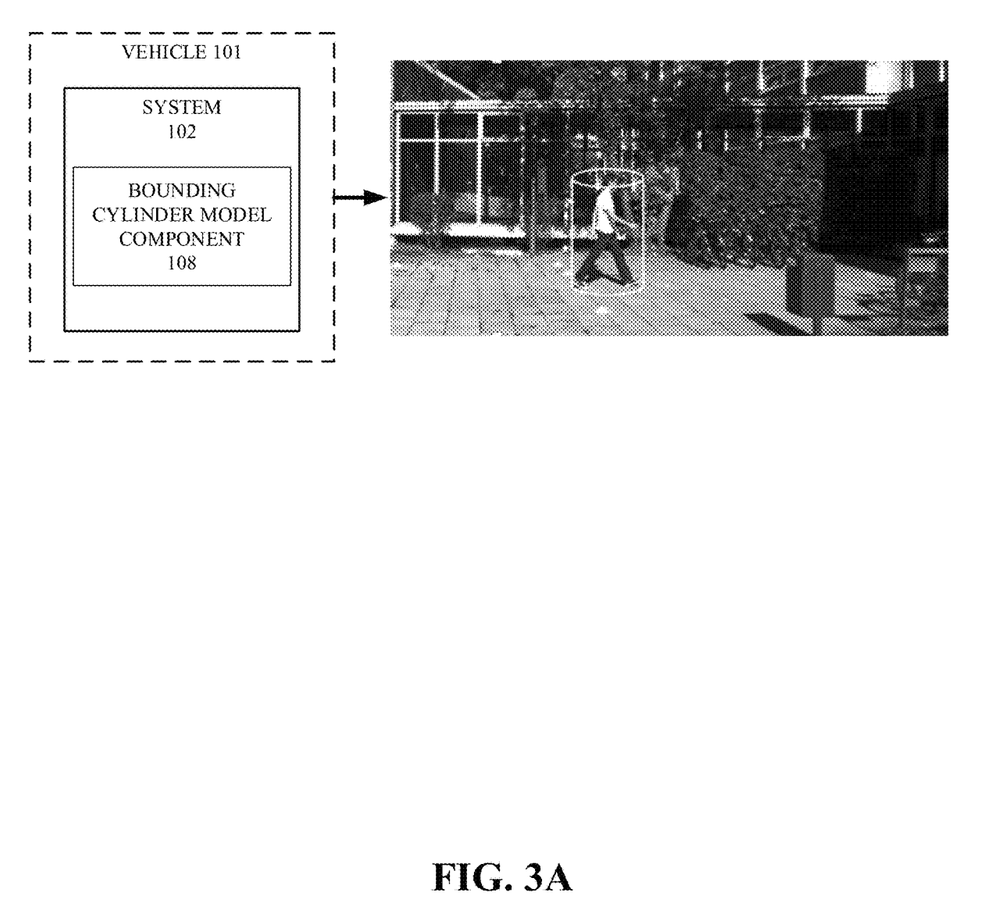
FIG. 3A illustrates an example, non-limiting computer-implemented system that facilitates pedestrian detection by employing a three-dimensional bounding cylinder model in accordance with one or more embodiments described herein.
Figure 3B:
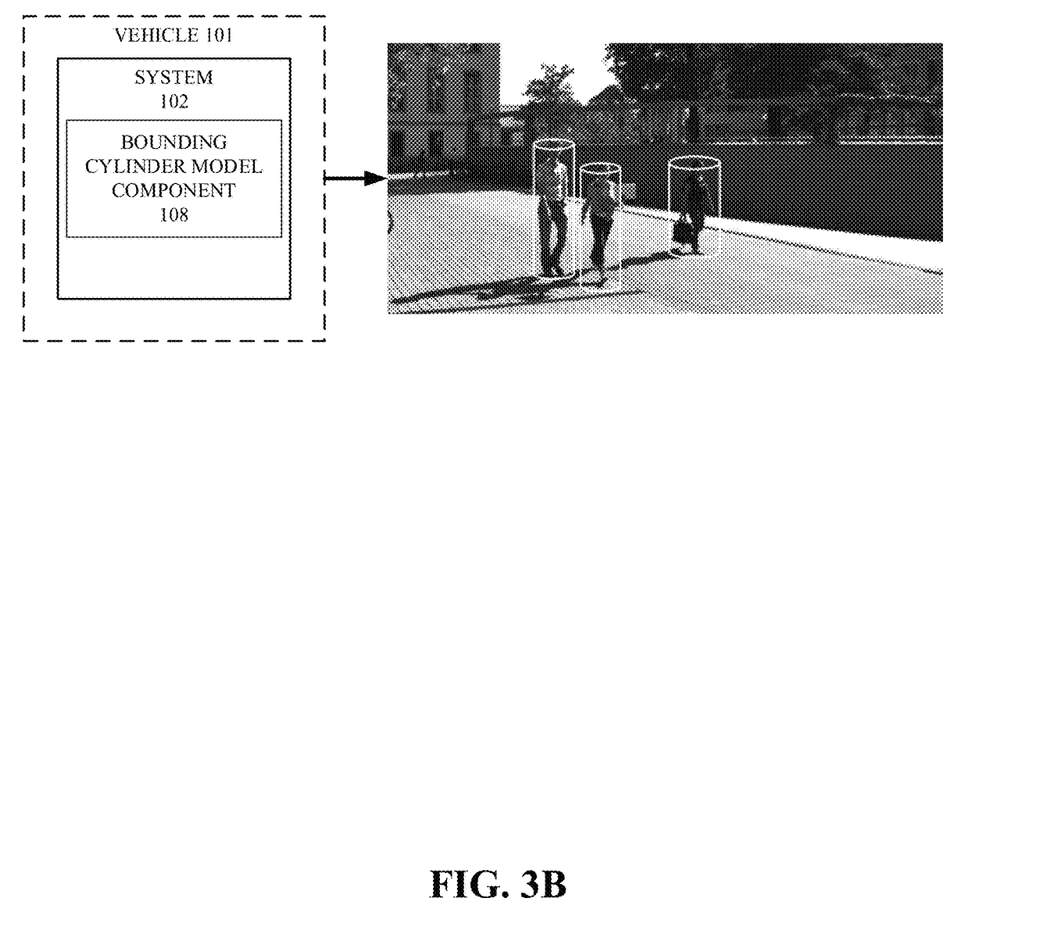
FIG. 3B illustrates an example, non-limiting computer-implemented system that facilitates pedestrian detection by employing a three-dimensional bounding cylinder model in accordance with one or more embodiments described herein.

FIG. 3A and FIG. 3B illustrate an example, non-limiting computer-implemented system that facilitates pedestrian detection by employing a three-dimensional bounding cylinder model in accordance with one or more embodiments described herein. FIG. 3A and FIG. 3B comprise vehicle 101, system 102, and bounding cylinder model component 108 of FIG. 1. In an embodiment, vehicle 101 can detect a pedestrian as a bounding cylinder model, or it can detect multiple pedestrians as multiple 3D respective bounding cylinder models wherein the multiple bounding cylinder models can overlap.

The bounding cylinder model component 108 of system 102 can be trained by the training component (not displayed in the figure) of system 102, to generate a bounding cylinder model for a respective pedestrian. The training can be based on object detection training, wherein the training component can use annotated visual information stored in memory as inputs for the object detection training.

The object detection training can comprise a deep learning neural network model which can have a keypoint detection branch and a regression branch, as discussed in one or more embodiments herein. The keypoint detection branch can assist the bounding cylinder model component 108 to compute the horizontal distance (x), vertical distance (y), and depth (z) for the center of a bounding cylinder model from the object detection sensor (not displayed in the figure) of system 102 which can be assigned the coordinate (0,0,0) in 3D space. The regression branch can assist the bounding cylinder model component 108 to compute the height and radius parameters of the bounding cylinder model. The combined information generated using the keypoint branch and regression branch can assist the bounding cylinder model component 108 to represent the pedestrian as the respective 3D bounding cylinder model having a height and radius, which is at a coordinate (x,y,z) from the object detection sensor of system 102, as discussed in one or more embodiments herein. CenterNet can be an example of a deep learning neural network model. In an embodiment, the display component (not displayed in the figure) of system 102 can also output a visual of the pedestrian represented as the respective 3D bounding cylinder model, to the vehicle, so that it can be viewed in real-time by the driver and/or other passengers.

Figure 4:
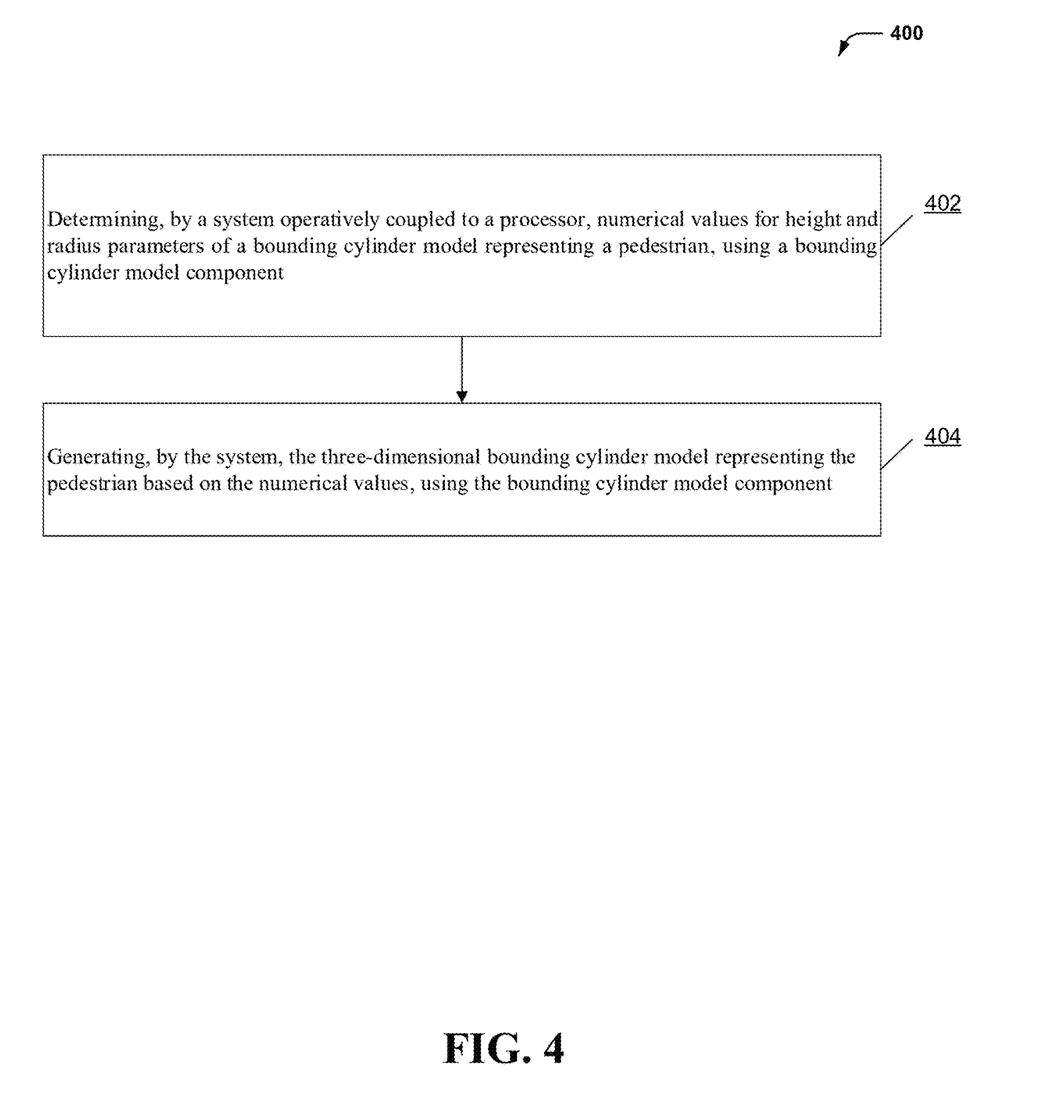
FIG. 4 illustrates a flow diagram of an example, non-limiting computer-implemented method that facilitates pedestrian detection by employing a three-dimensional bounding cylinder model in accordance with one or more embodiments described herein.

FIG. 4 illustrates a flow diagram of an example, non-limiting computer-implemented method that facilitates pedestrian detection by employing a three-dimensional bounding cylinder model in accordance with one or more embodiments described herein. Repetitive description of like elements and/or processes employed in respective embodiments is omitted for sake of brevity.

In an embodiment, environment 400 can comprise, at 402, a computer-implemented method which can facilitate determining, by a system operatively coupled to a processor, numerical values for height and radius parameters of a bounding cylinder model representing a pedestrian, using a bounding cylinder model component. At 404, the computer-implemented method can facilitate generating, by the system, the three-dimensional bounding cylinder model representing the pedestrian based on the numerical values, using the bounding cylinder model component.

Figure 5:
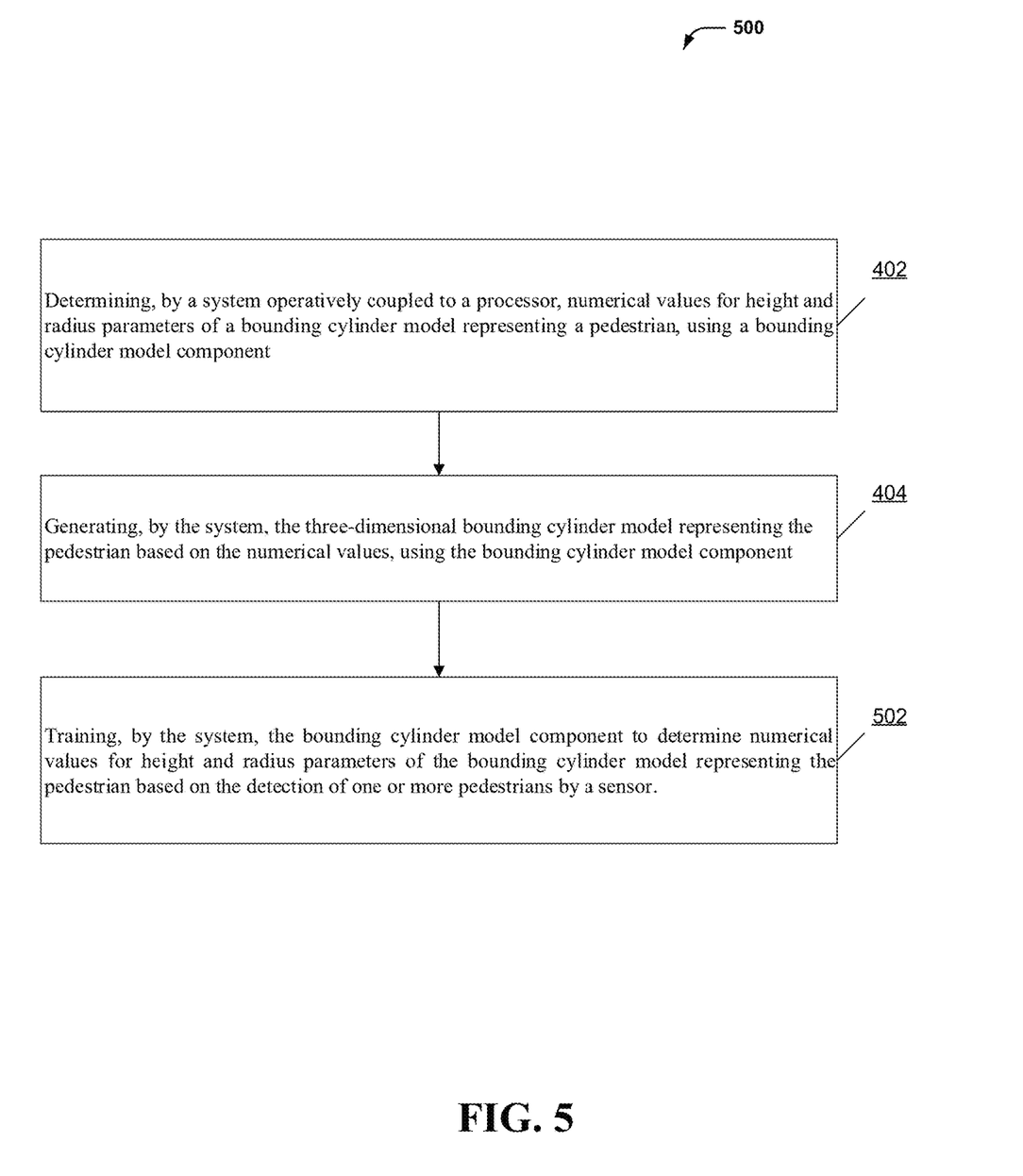
FIG. 5 illustrates a flow diagram of an example, non-limiting computer-implemented method that facilitates the detection of pedestrians as objects enclosed by a three-dimensional bounding cylinder model.

FIG. 5 illustrates a flow diagram of an example, non-limiting computer-implemented method that facilitates the detection of pedestrians as objects enclosed by a three-dimensional bounding cylinder model. Repetitive description of like elements and/or processes employed in respective embodiments is omitted for sake of brevity.

In an embodiment, environment 500 can comprise, at 402, a computer-implemented method which can facilitate determining, by a system operatively coupled to a processor, numerical values for height and radius parameters of a bounding cylinder model representing a pedestrian, using a bounding cylinder model component. At 404, the computer-implemented method can facilitate generating, by the system, the three-dimensional bounding cylinder model representing the pedestrian based on the numerical values, using the bounding cylinder model component. At 502, the computer-implemented method can facilitate training, by the system, the bounding cylinder model component to determine numerical values for height and radius parameters of the bounding cylinder model representing the pedestrian based on the detection of one or more pedestrians by a sensor.

Figure 6:
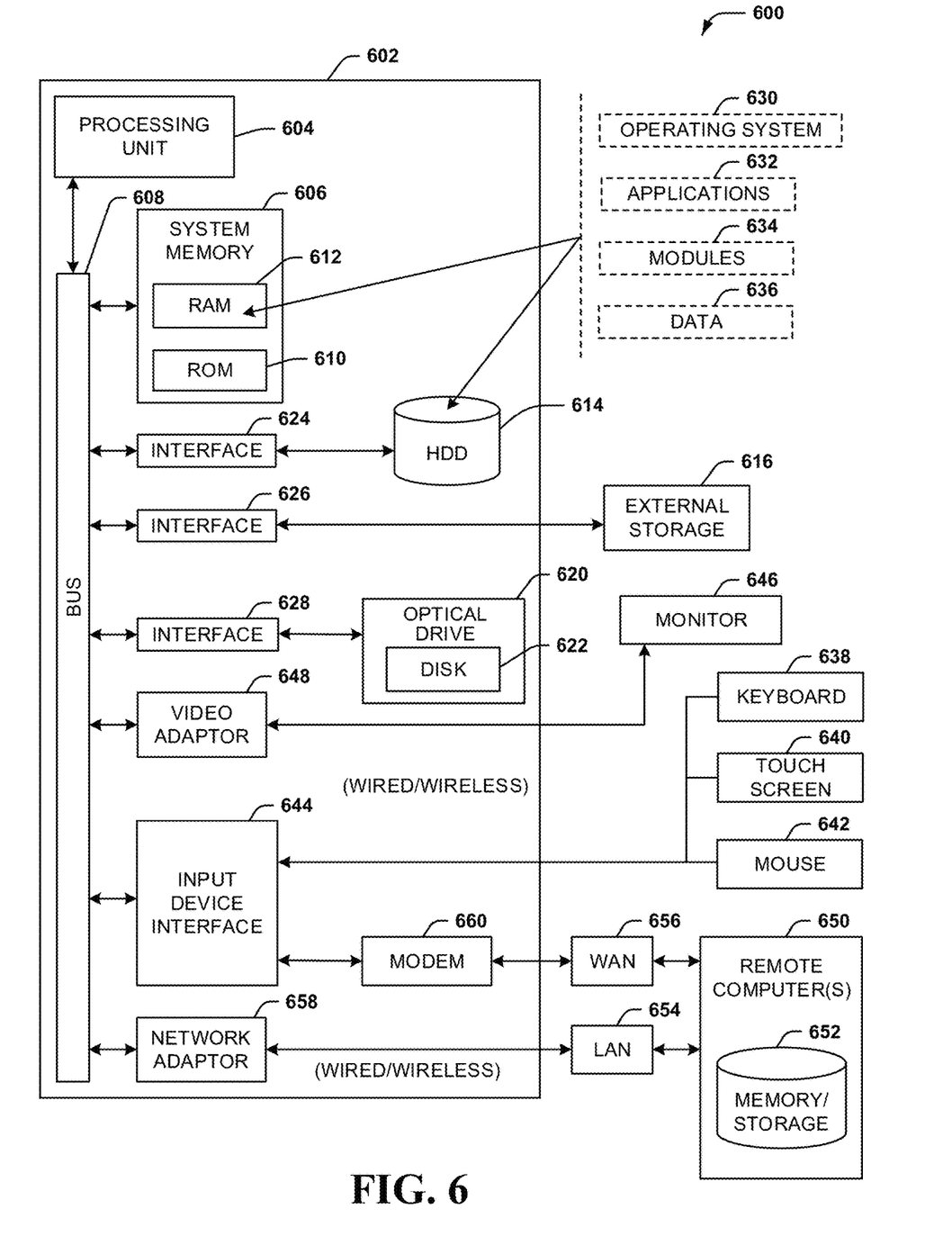
FIG. 6 is an example, non-limiting computing environment in which one or more embodiments described herein can be implemented.

FIG. 6 is an example, non-limiting computing environment in which one or more embodiments described herein can be implemented. In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1794 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1794 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN)

656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What is claimed:

1. A system, comprising:
   a memory that stores computer executable components; and
   a processor that executes at least one of the computer-executable components that:
   detects, using sensor data from an object detection sensor of a vehicle, a pedestrian;
   determines, using a neural network and the sensor data:
   an axis running perpendicular to a ground under the pedestrian and running vertically through a center of the pedestrian,
   a height of the pedestrian from the ground to a highest portion of the pedestrian along the axis, and
   a radius of the pedestrian from the axis to a portion of the pedestrian that is furthest horizontally from the axis; and
   generates, using the neural network, a three-dimensional bounding cylinder model representing the pedestrian, wherein a height of the three-dimensional bounding cylinder model is equal to the height of the pedestrian, and wherein a radius of the three-dimensional bounding cylinder model is equal to the radius of the pedestrian.

2. The system of claim 1, wherein the at least one of the computer-executable components further:
   determines, using the neural network and the sensor data, whether the pedestrian is standing.

3. The system of claim 2, wherein the determining whether the pedestrian is standing comprises:
   determining an angle of a part of the pedestrian relative to the axis.

4. The system of claim 1, wherein the object detection sensor comprises at least one of a Light Detection and Ranging sensor, a camera sensor, or a Red, Green, Blue (RGB) sensor.

5. The system of claim 1, wherein the at least one of the computer-executable components further:
   trains the neural network to determine the axis running perpendicular to the ground under the pedestrian and running vertically through the center of the pedestrian, determine the height of the pedestrian, determine the radius of the pedestrian, and generate the three-dimensional bounding cylinder model representing the pedestrian.

6. The system of claim 5, wherein the training employs annotated visual information and object detection training.

7. The system of claim 1, wherein the at least one of the computer-executable components further:
   generates an alert based on a determination that the three-dimensional bounding cylinder model and the vehicle have a likelihood of collision greater than a defined threshold.

8. A computer-implemented method, comprising:
   detecting, by a system operatively coupled to a processor, using sensor data from an object detection sensor of a vehicle, a pedestrian;
   determining, by the system, using a neural network and the sensor data:
   an axis running perpendicular to a ground under the pedestrian and running vertically through a center of the pedestrian,
   a height of the pedestrian from the ground to a highest portion of the pedestrian along the axis, and
   a radius of the pedestrian from the axis to a portion of the pedestrian that is furthest horizontally from the axis; and
   generating, by the system, using the neural network, a three-dimensional bounding cylinder model representing the pedestrian, wherein a height of the three-dimensional bounding cylinder model is equal to the height of the pedestrian, and wherein a radius of the three-dimensional bounding cylinder model is equal to the radius of the pedestrian.

9. The computer-implemented method of claim 8, further comprising:
   determining, by the system, using the neural network and the sensor data, whether the pedestrian is standing.

10. The computer-implemented method of claim 9, wherein the determining whether the pedestrian is standing comprises:

determining an angle of a part of the pedestrian relative to the axis.

11. The computer-implemented method of claim 8, wherein the object detection sensor comprises at least one of a Light Detection and Ranging sensor, a camera sensor, or a Red, Green, Blue (RGB) sensor.

12. The computer-implemented method of claim 8, further comprising:
    training, by the system, the neural network to determine the axis running perpendicular to the ground under the pedestrian and running vertically through the center of the pedestrian, determine the height of the pedestrian, determine the radius of the pedestrian, and generate the three-dimensional bounding cylinder model representing the pedestrian.

13. The computer-implemented method of claim 12, wherein the training employs annotated visual information and object detection training.

14. The computer-implemented method of claim 8, further comprising:
    generating, by the system, an alert based on a determination that the three-dimensional bounding cylinder model and the vehicle have a likelihood of collision greater than a defined threshold.

15. A non-transitory computer-readable medium having instructions stored thereon that, in response to execution, cause a system comprising a processor to perform operations comprising:
    detecting, using sensor data from an object detection sensor of a vehicle, a pedestrian;
    determining, using a neural network and the sensor data:
        an axis running perpendicular to a ground under the pedestrian and running vertically through a center of the pedestrian,
        a height of the pedestrian from the ground to a highest portion of the pedestrian along the axis, and
        a radius of the pedestrian from the axis to a portion of the pedestrian that is furthest horizontally from the axis; and
    generate, using the neural network, a three-dimensional bounding cylinder model representing the pedestrian, wherein a height of the three-dimensional bounding cylinder model is equal to the height of the pedestrian, and wherein a radius of the three-dimensional bounding cylinder model is equal to the radius of the pedestrian.

16. The non-transitory computer-readable medium of claim 15, wherein the operations further comprise:
    determining, using the neural network and the sensor data, whether whether the pedestrian is standing.

17. The non-transitory computer-readable medium of claim 16, wherein the determining whether the pedestrian is standing comprises:
    determining an angle of a part of the pedestrian relative to the axis.

18. The non-transitory computer-readable medium of claim 15, wherein the operations further comprise:
    training the neural network to determine the axis running perpendicular to the ground under the pedestrian and running vertically through the center of the pedestrian, determine the height of the pedestrian, determine the radius of the pedestrian, and generate the three-dimensional bounding cylinder model representing the pedestrian.

19. The non-transitory computer-readable medium of claim 18, wherein the training, employs annotated visual information and object detection training.

20. The non-transitory computer-readable medium of claim 15, wherein the operations further comprise:
    generating an alert based on a determination that the three-dimensional bounding cylinder model and the vehicle have a likelihood of collision greater than a defined threshold.

* * * * *